June 17, 1941.  T. DE STEFANI ET AL  2,245,762
STERILIZER
Filed Jan. 18, 1939  4 Sheets-Sheet 1
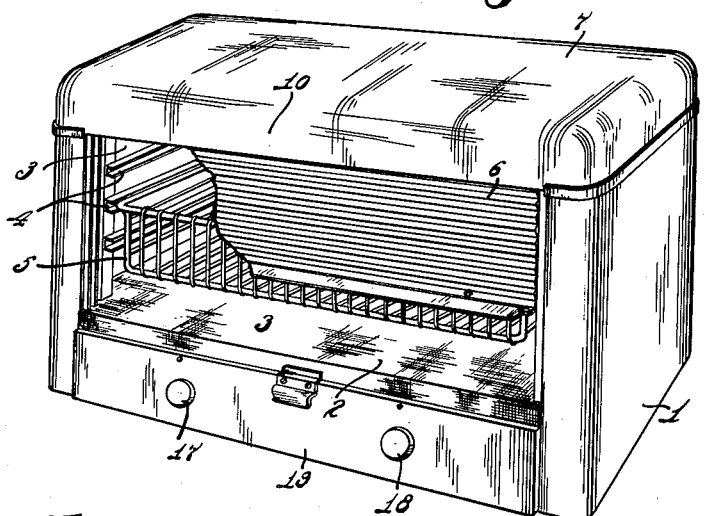
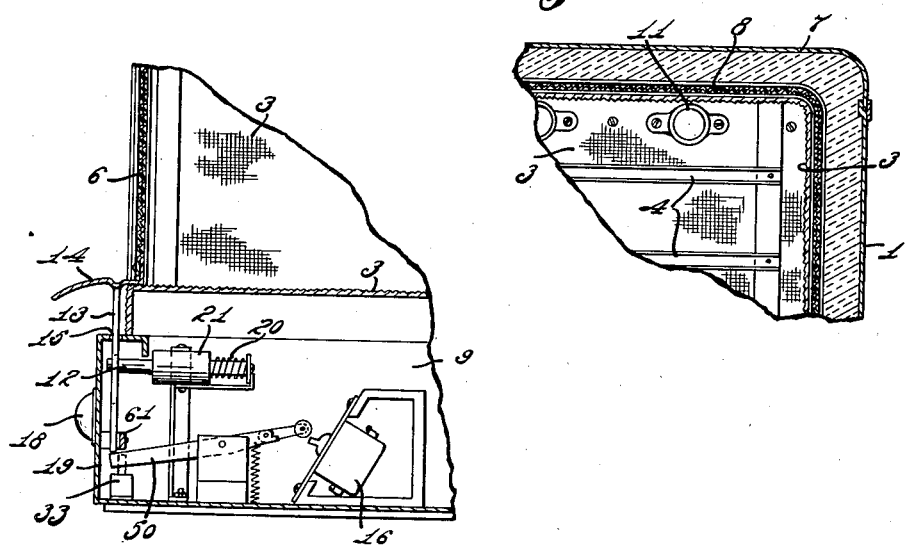
INVENTORS.
Tubby DeStefani and
Rudolph Yuga,
BY
Hood + Hahn.
ATTORNEYS.

INVENTORS.
Tully DeStefani and
Rudolph Yuga,
BY
Hood & Hahn.
ATTORNEYS.

INVENTORS.
Tullio DeStefani and
BY Rudolph Yuza,
Hood & Hahn.
ATTORNEYS.

Patented June 17, 1941

2,245,762

UNITED STATES PATENT OFFICE 2,245,762

STERILIZER

Tully De Stefani and Rudolph Yuza, Chicago, Ill., assignors to The Liquid Carbonic Corporation, Chicago, Ill., a corporation of Delaware Application January 18, 1939, Serial No. 251,454

14 Claims. (Cl. 250—45)

The invention relates to improvements in sterilizing cabinets and one of the objects of the invention is to provide an apparatus for taking advantage of the sterilizing properties of violet rays to thoroughly and properly sterilize various articles, such for instance, as glassware used in public eating places, flat silverware used in soda fountains, or any other articles which it is desired to render thoroughly sterile.

Another object of the invention is to provide a sterilizing cabinet adapted to use violet ray producing lamps which will prevent undue injury to the operator and which will insure the articles to be sterilized remaining in the cabinet for proper sterilization.

Another object of the invention is to provide a sterilizing cabinet which, after having closed and the sterilizing lamps energized, will give a visible signal to the operator that sterilization is taking place, or, in event the apparatus is defective, will likewise indicate by a visible signal to the operator that the sterilizing lamps are not in operation and that it will be perfectly safe for the operator to again open the cabinet.

Other objects and advantages of the invention will appear more fully hereinafter in the accompanying specification and claims.

In the accompanying drawings:

Fig. 1 is a perspective view of the sterilization cabinet embodying the invention;

Fig. 2 is a detail transverse section showing a locking mechanism for the closure;

Fig. 3 is a detail transverse section showing more particularly the sterilization lamp mounting;

Figure 4:
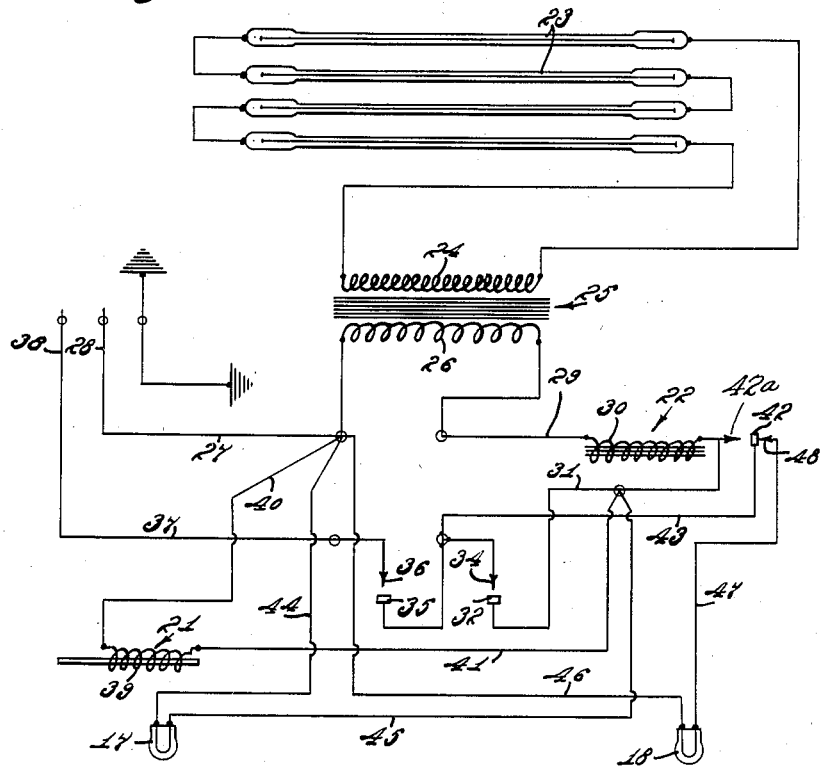
Fig. 4 is a diagrammatic view of a circuit arrangement of the operating parts.

In the embodiment of the invention illustrated, a suitable cabinet 1 is provided which may be of sheet metal or other suitable material and is provided in one side thereof a deposit opening 2.

The interior of the cabinet is formed of reflector surfaces 3 which are preferably formed of polished aluminum corrugated and cross-corrugated to provide a series of reflector domes adapted to reflect the violet rays of the sterilization lamps to all parts of the cabinet.

The interior of the cabinet, at either end, is provided with suitable slides 4 adapted to receive supporting racks or trays 5 which are removably supported in position and which are adapted to support articles to be sterilized.

The front of the cabinet is closed by a flexible sliding, preferably sheet metal, door 6 which, when raised, will slide back under the top 7, and due to its flexible construction, within a suitable spacing compartment 8 formed in the cabinet. The cabinet may be suitably insulated, if desired, and is provided at its bottom with a receptacle or compartment 9 for the reception of the various operating parts of the mechanism.

Mounted within the top of the cabinet 7 and behind the overhanging portion 10 of the front are a series of violet ray lamps which may be of the type commercially known as "Sterilamps." At the opposite ends of the cabinet, within the same and under the top, there is mounted a plurality of Sterilamp receiving sockets 11. It will be noted that these sockets are mounted well under the top of the cabinet and in fairly close proximity to the under side of the top thereof so that there is very little danger of the direct rays of these lamps ever, if for any reason they should become lighted with the door open, shining in the eyes of the operator. Furthermore, by the mounting of the lamps well up in the top of the cabinet, the violet rays thereof are more directly thrown downwardly upon the articles to be sterilized and by the use of the peculiarly shaped reflecting surfaces, dead spots in the cabinet are reduced to a minimum.

In order to prevent any injurious effect of the rays of the lamp upon the eyes or upon the body of the operator, we provide means whereby the circuit through the lamps cannot be established until after the door 6 has been completely closed. Furthermore, in order to insure proper sterilization of the articles placed in the cabinet, we provide means whereby the door, after having once been closed, cannot again be opened until after a predetermined period.

To this end, a locking bolt 12 is mounted within compartment 9 which bolt is adapted to engage and lock when projected in an opening in a downwardly extending latch 13 mounted on the operating handle 14 of the door 6. The compartment 9 is a closed compartment to which access is normally prevented and the latch 13 is adapted to project into this compartment through a suitable slot 15 in the top closure of the compartment.

The period during which the door must remain closed, after having once been closed, is controlled by suitable time switch 16 likewise mounted in the compartment 9, and for the purpose of indicating to the operator that the sterilization lamps are illuminated and operating, we provide a visible signal in the form of a lamp 17. A secondary signal 18 is provided for indicating to the operator that the apparatus is not functioning properly in event anything goes wrong within the apparatus. These two lamps are visible in the front face, or visible through the front cover 19 of the compartment 9.

The bolt 12 is projected against the action of a normally retracting spring 20 into its locking position through the medium of a solenoid 21, the circuit of which, as well as the circuit through the transformer for the violet ray lamps and other parts is controlled by a relay switch 22.

Referring more particularly to the diagrammatic circuit arrangement illustrated in Fig. 4, it is to be seen that the Sterilamps 23 are connected in series in the circuit of the secondary 24 of a suitable transformer 25 which is adapted to step up, in commercial practice, 110 volt, 60 cycle, A. C. current, to about 3000 volts on the secondary side. The primary 26 of the transformer is adapted to be connected by a conductor 27 with one side 28 of the supply line. The opposite side of the transformer is connected by conductor 29 with one terminal of the winding 30 of the relay switch 22. The opposite terminal of this winding is connected by conductor 31 with one contact 32 of a momentary switch 33, the opposite contact 34 of which is connected to a contact 35 of the time controlled switch. The opposite contact 36 of the time controlled switch is connected by the conductor 37 with the opposite side 38 of the line. One terminal of the winding 39 of the locking bolt operating solenoid 21 is connected by conductors 40 with the conductor 27 and the opposite terminal of this winding is connected by conductor 41 with the conductor 31. A movable contact 42 of this relay switch is adapted to be connected by conductor 43 with the contact 35 of the time switch 16. It is also to be noted that one terminal of the signal lamp 17 is connected through the conductor 44 with the conductor 27 and that the other terminal of this lamp is connected by conductor 45 with the conductor 31. Also, it is to be noted that one terminal of the lamp 18 is connected by conductor 46 with conductor 27 and that the opposite terminal thereof is connected by conductor 47 with a stationary and normally closed contact 48 of the relay switch.

Figure 5:
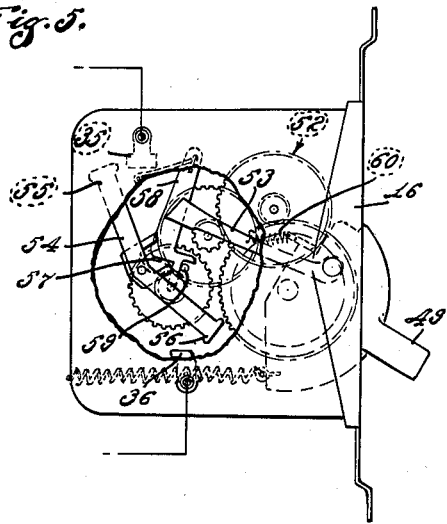
Fig. 5 is a detail view showing the time switch.
Figure 6:
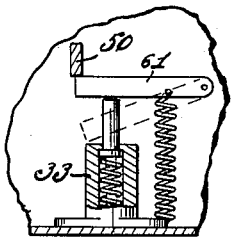
Fig. 6 is a detail view of the momentary switch.
Figure 7:
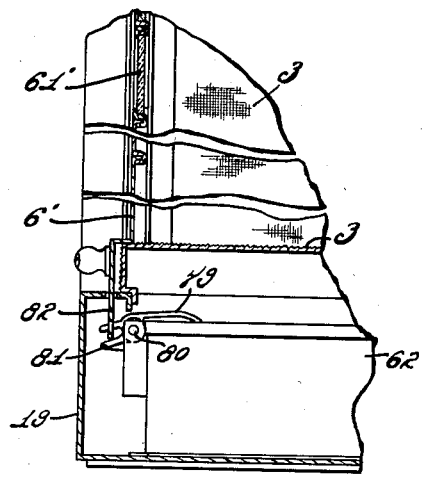
Fig. 7 is a detail view showing a modified door structure.

In Fig. 5, there is illustrated a type of time switch adapted to control the operation of the sterilizer heretofore described. This time switch is provided with an operating finger 49 which is in the path of a lever 50 mounted within the compartment, which lever, in turn, has one end 51 in the path of the latch 13. The finger 49, when raised, energizes a coiled spring of a spring driven gear train 52 and at the same time moves the lever 53 into engagement with the notched arm 54 rotating this arm and associated contacts 55 and 56 into engagement with the contacts 35 and 36. This arm 53 is restrained against movement in the opposite direction by a lug 57 on a swinging lever 58. With the energization of the gear train spring, the gear train will commence to rotate and will continue to rotate for a predetermined period. It has been found that about two minutes is proper time for subjecting the articles to the action of the rays of the Sterilamps. After the elapse of two minutes, a pin 59 will have traveled far enough to strike the lever 58 thereby moving the stop 57 out of the restraining position for the lever 53 which lever, under the influence of the coiled spring 60 will raise, thereby again kicking open the switch arms 55 and 56 and opening the circuit.

The momentary switch 33 is of a construction whereby its contacts 32 and 34 are normally biased open by a suitable spring operating means. The movable contact of this switch is in the path of a pivoted arm 61 in turn in the path of the lever 50 but in such position that after the lever 50 has been moved to the limit of its downward stroke by the engagement of the latch 13, the arm 61 will be released to thereby move upwardly permitting the opening of the momentary switch.

In operation, when the operator moves the door 6 downwardly to closed position, the projection 13 on this door striking lever 50 will momentarily close contacts 32 and 34 and also close the time switch including its contacts 35 and 36. As soon as contacts 32 and 34 are closed, circuit will be established by conductors 27 through the primary winding 26 of the transformer conductors 29, windings 30 of the relay 22 and back to the opposite side of the line by conductors 31, contacts 32 and 34 of the momentary switch and contacts 35 and 36 of the time switch. The primary circuit is thus energized and if the lamps 23 are in proper condition or if the circuit, including the secondary 24 is in proper working order, sufficient current will flow through the winding 30 of the relay switch 22, thus moving contact 42 into engagement with contact 42a, thereby establishing a holding circuit through winding 30 of relay 22 by the way of the time control switch contacts 35 and 36. An operating circuit will be established through the winding 39 of the bolt operating solenoid 31, thus locking the door in closed position, it being observed that this operating circuit includes the contacts of the time control switch 35 and 36. Therefore, so long as the time control switch 35 and 36 is closed, the door will be held in locking position, the lamps 23 will be illuminated, and this fact will be indicated to the operator by the signal lamp 17. Due to the fact that the circuit through the lamp 17 is maintained by engagement of the contacts 36, 37 and 42a, this lamp will continue to glow so long as the lamps are in operation. As soon as the predetermined elapsed time has taken place, the time control switch, as heretofore explained, will cause the pin to kick the arms of the time controlled switch out of engagement with the contacts 35 and 36, thus opening the circuit not only of the primary winding 26 of the transformer 25, but also of the holding winding 30 of the relay 22. This, of course, opens the circuit through the winding 39 of the solenoid 21 releasing the bolt 12 thus permitting the door to be raised and the contents of the sterilizer to be removed.

If, for any reason the circuit of the secondary winding 24 is interrupted, as for instance, by the breakage of one or more of the lamps 23, or the failure of one or more of the lamps 23 to operate, sufficient current will not pass through the winding 30 of the relay switch 22 and it being remembered that, at this time, with contact 42 out of engagement with contact 42a, the circuit of this winding is dependent upon the remaining closed of the contacts 32 and 34 and it being remembered that these contacts are only momentarily closed, the winding 30 will be immediately deenergized and the primary circuit will be opened. At the same time, due to the remaining opening of the contacts 42 and 42a, the circuit will not be established through the winding 39 and, therefore, the bolt operating solenoid will not be energized so that the cabinet will not be locked. In order to indicate that the lamps 23 are not properly functioning, it is to be noted that contact 42, unless moved into engagement with the contact 42a is engaged with contact 48, thus maintaining circuit through the trouble indicator lamp 18, it being remembered that the time switch 35 and 36 has been closed even though the momentary switch 32 and 34 has opened. Therefore, the operator, seeing from the continued glow of lamp 18, that the lamps 23 are not properly functioning, he can raise the door or closure 6 and take the necessary steps to repair the damage, even though the time switch has not completed the cycle of movement, because under these circumstances, as has been pointed out, the circuit through the primary, has already been opened and there is no voltage therefore in the secondary circuit.

In the structure illustrated in Figs. 7 to 11, we have dispensed with the trouble indicator lamp 18 and the "on" indicator lamp 17. In order, however, that the operator may observe whether the sterilizing lamps are functioning, we have placed in the door 6' suitable windows 61' which are impervious to the passage of the injurious rays from the sterilizing lamps but which, at the same time, permit inspection of the interior of the cabinet.

To permit the ready removal of the power-controlling units, for the purpose of repair or adjustment and in order that a defective power unit may be removed from the cabinet and a new one inserted, to avoid unnecessary tie-up of the sterilizer, in the structure illustrated in Figs. 7 to 11, we have mounted all of the controlling parts within a single enclosing casing. To this end, we provide a suitable enclosing casing or box 62 within which all of the controlling parts are mounted to provide a complete "power unit." Within this box, we mount a transformer 25', a bolt operating solenoid 31', the time switches 35' and 36', the momentary switch 33' and relay switch 22'.

The transformer is provided with suitable separable connectors 63 and 64, adapted to extend through the casing, by which the leads from the sterilizing lamps may be separably connected thereto. In addition to these separable connections, the casing is provided with one member 65 of a separable connector, the opposite member of which is connected by a cable to a suitable connector plug mounted on the side of the cabinet. In addition to these connectors, there is also provided a third separable connector 66 on the casing, the other member of which is connected by a cable to an outlet plug mounted on the side of the cabinet, to which suitable electrically operated advertising or indicating apparatus may be attached which, when the sterilizer is set in operation, will likewise be operated.

In the modified structure, the time switch, instead of being spring driven, includes a synchronous electric motor 67, the shaft of which, through suitable gearing 68, drives a time switch-operating pin or trip 69. This trip 69 is adapted, during a portion of its cycle of movement, to engage a trip arm 70 operating to close the normally open contact points 71 and 72 of the time-control switch. In addition to the normally opened contacts 71 and 72 of this time-control switch, there is also provided a pair of normally closed contact points 73 and 74. The movement of the pin or trip 69, in its engagement with the trip arm or spring arm 70 is such that during the initial part of its movement, the normally open contacts 71 and 72 will be closed and thereafter, as a result of the continued movement of the pin or trip 69, the normally closed contacts 73 and 74 will be opened.

The momentary switch is provided with a trip 75 pivotally mounted and adapted to operate a spring arm 76 in turn adapted to move toward one another, when the switch trip 75 is moved in a closing direction, a pair of momentary switch contacts 77 and 78.

The momentary switch trip 75 is operated by an operating arm 79 pivoted at 80 to the side walls of the enclosing box 62 and the front end of this arm, projecting beyond the pivot point, is provided with a yoke 81, the lower arm of which is longer than the upper arm. The normal inoperative position of this arm 79 is such that when the sliding door 6' is lowered, a projection 82 on the door will engage in the yoke 81, rotating the operating arm on its pivot until its rear end engages and moves the momentary switch trip 75. By this time, the arm and its yoke has reached a substantially horizontal position, with the upper arm of the yoke engaging in the opening of the projection 82 and with the yoke and arm held in this position by the locking bolt 12', it will be impossible to again operate the door until the operating arm is released.

The relay switch 22', like in the structure illustrated in Figs. 1 to 6 inclusive, includes the solenoid winding and two pairs of spring contacts 83 and 84 and 85 and 86 mounted on suitable spring arms, one set of which is adapted to be moved by a solenoid armature 87.

Figure 11:
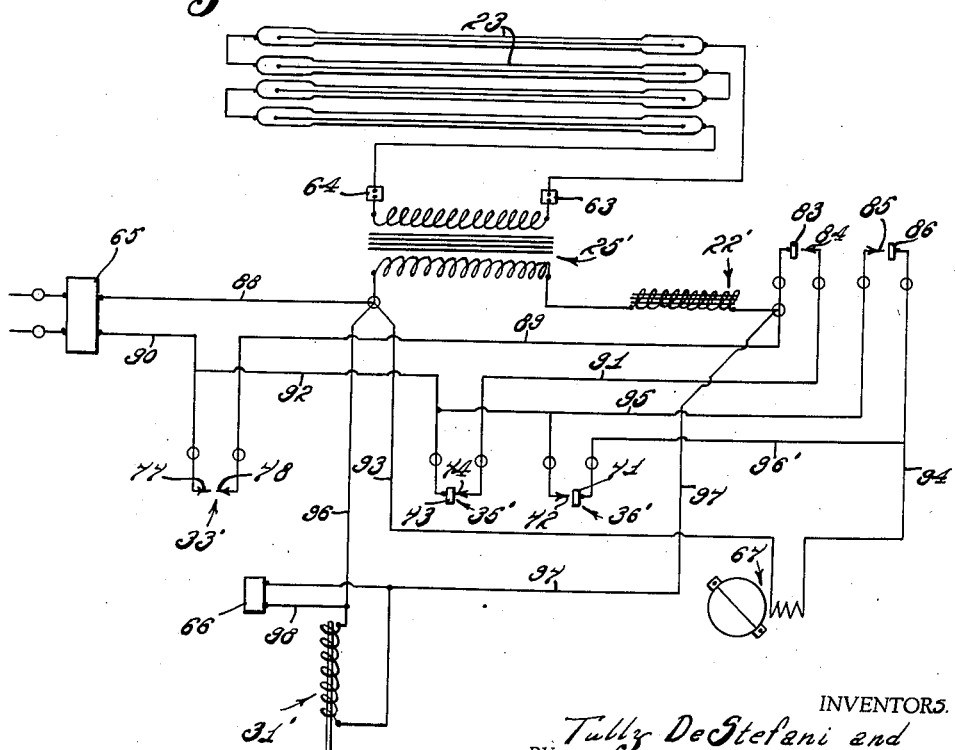
Fig. 11 is a diagrammatic view of the circuit arrangement of the modification.
Figure 8:
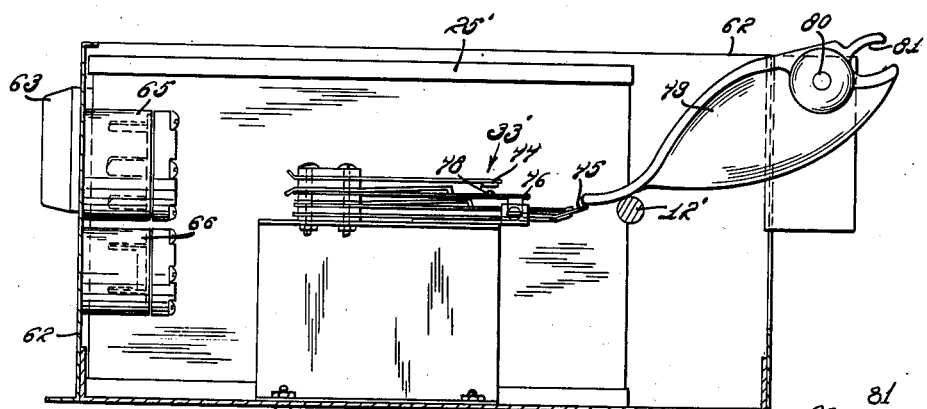
Fig. 8 is a transverse sectional view of a control unit embodying a modification of my invention.
Figure 9:
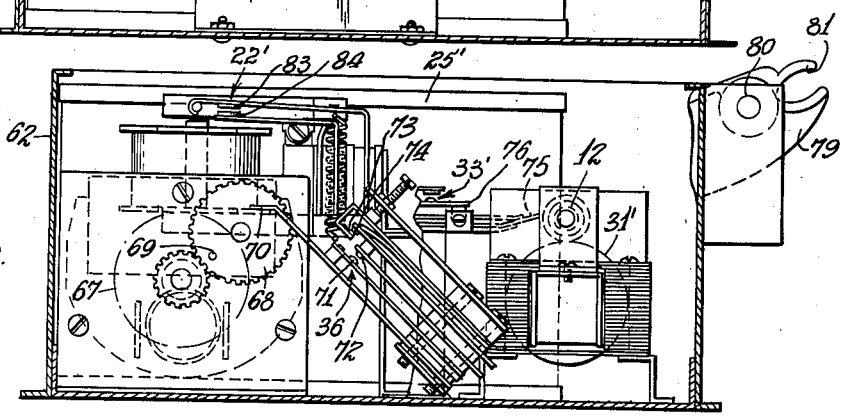
Fig. 9 is a further detail transverse sectional view of the modification.
Figure 10:
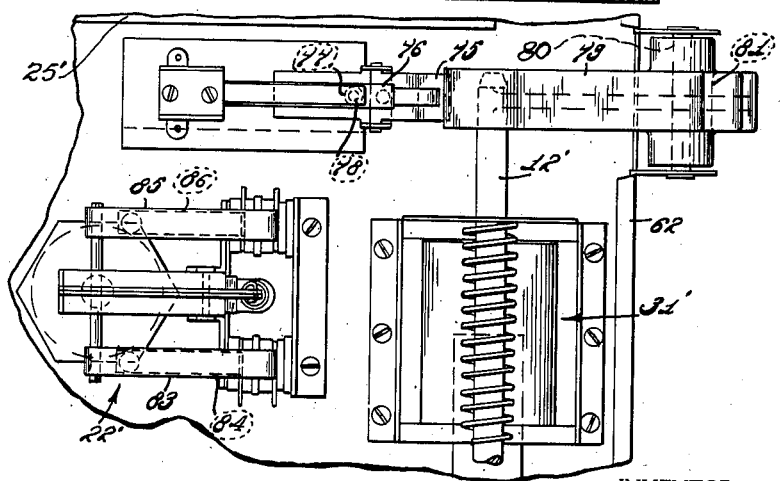
Fig. 10 is a partial plan view of the power unit with the cover removed.

Referring now to the diagrammatic view illustrated in Fig. 11, when the sliding door is closed, contacts 77 and 78 are through the operating arm 79 momentarily closed, thus momentarily establishing a circuit from conductor 88 through the primary winding of the transformer 25' through the winding of the current relay 22' by conductor 89 across contacts 77 and 78 back to the opposite side 90 of the line. The momentary energization of the relay 22' closes the set of contacts 83 and 84 and the set of contacts 85 and 86 of the current relay switch. The closing of the contacts 83 and 84 establishes a circuit from the conductor 88 through the primary of the transformer, through the winding of the current relay, across contacts 83 and 84, by conductor 91, across the normally closed contacts 73 and 74 and by conductor 92 to the opposite side 90 of the line, thus establishing a holding circuit for the current relay as well as a continuing circuit for the primary of the transformer independent of the momentarily closed contacts 77 and 78. As long as the sterilizing lamps are in operative condition, this current will be operative. At the same time that the contacts 83 and 84 are closed, the contacts 85 and 86 are closed, thus establishing a circuit by conductor 93 through the winding of the synchronous motor 67 by conductor 94 across the contacts 85 and 86 and back to the opposite side of the line by conductors 95 and 92. This then energizes the driving motor of the time-control switch.

At the same time the maintaining circuit is established for the current relay an energizing circuit is established through the winding 31' of the solenoid lock by conductors 96 and 97 across the contacts 83 and 84 and back to the opposite side of the line 99.

The synchronous motor of the time control switch will continue to operate for a predetermined time and until the trip pin 69 engages the trip arm 70. By the movement of this trip arm 70, the contacts 73 and 74 are opened and at the same time the contacts 71 and 72 are closed. The opening of the contacts 73 and 74 opens the holding circuit of the relay switch 22' and, at the same time, of course opens the circuit of the primary of the transformer, thus cutting off the supply of current to the sterilizing lamps. However, the closing of the contacts 71 and 72 at the same time contacts 73 and 74 are opened maintains the current through the winding of the synchronous motor 67 by the way of conductor 96 across the contacts 72 and 71 and thence by conductors 95 and 92 back to the opposite side of the line. The timing motor thus continues to run for the short period and until the trip pin disengages itself from the trip arm 70, at which time the circuit through the motor will be opened permitting the motor to come to a rest ready for another cycle of movement. In order that indicating apparatus or advertising apparatus adapted for connection to the coupling 66 may be energized at the same time that the solenoid lock is energized, this coupling 66 is connected in parallel by the conductors 97 and 98 with the winding of the solenoid 31' so that when this winding is energized, any electrical apparatus connected to the coupling 66 will likewise be energized.

We claim as our invention:

1. In a sterilizing cabinet having a deposit and removal opening therein and a movable closure member for the same, said closure member preventing access to the interior of the cabinet when closed the combination with electrical sterilizing units arranged in said cabinet, of means operated by the closing of said closure member for completing an energizing circuit through said sterilizing units, and means operated upon the establishment of said energizing circuit for maintaining said closure member against opening for a predetermined period, said maintaining means being operable only in event said sterilizing units become operable.

2. In a sterilizing cabinet having a deposit opening therein and a movable closure member for the same, the combination with electrical sterilizing units arranged in said cabinet, of means operated by the closing of said closure member for completing an energizing circuit through said sterilizing unit, means operated upon the establishment of said energizing circuit for maintaining said closure member against opening for a predetermined period and means visible from the exterior of the cabinet for indicating the operative condition of the sterilizing units, said maintaining means being operable only in event said sterilizing units become operable, 3. In a sterilizing cabinet having a deposit and removal opening therein and a movable closure for the same, said closure preventing access to the interior of the cabinet when closed the combination with electrical sterilizing units arranged in said cabinet, of means operated upon the closure of said closure member for closing an energizing circuit through said sterilizing units for a predetermined period, and means for preventing the opening of said closure member during said predetermined period, said preventing means being operable only in event said sterilizing units become operable.

4. In a sterilizing cabinet having a deposit and removal opening therein and a movable closure member for said opening, said closure member preventing access to the interior of the cabinet when closed the combination with electrical sterilizing units mounted within said cabinet, of timed control means for controlling the circuit through said sterilizing units and operated upon the closing of said closure member, and electromagnetic means for locking said closure member against opening controlled by said timed control means, said electromagnetic means being operable only in the event current is passing through said sterilizing units.

5. In a sterilizing cabinet having a deposit opening therein and a movable closure for the same, the combination with violet ray lamps arranged in said cabinet, an electric circuit for said lamps including a transformer having a secondary winding adapted to deliver current to said lamps and a primary winding adapted to be connected with a source of power supply, a timed control switch operated upon the closure of said closure member for controlling the circuit through said primary winding, and means for opening said circuit in event said secondary circuit is not in operable condition.

6. In a sterilizing cabinet having a deposit opening therein and a movable closure for the same, the combination with violet ray lamps mounted within said cabinet, a transformer having a secondary winding adapted to supply current to said lamps, the primary winding of said transformer being adapted for connection with a source of electromagnet means for locking said closure member against opening, a timed control switch for controlling the circuit through said primary winding and through said electromagnetic locking means upon the closure of said closure member, and means for opening said primary circuit in event said secondary circuit is not completed.

7. In a sterilizing cabinet having a deposit opening therein and a movable closure for the same, the combination with violet ray lamps mounted within said cabinet, of a transformer having a secondary winding adapted to supply current to said lamps and a primary winding adapted to be connected to a source of power supply, of electromagnetic means for locking said closure member in closed position, a timed control switch operated upon the closure of said closure member for controlling an energizing circuit through said primary winding and through said locking means, a visible signal for indicating the completion of the circuit through said violet ray lights, and means for opening the primary winding circuit, the signal circuit, and a locking circuit, in event the secondary circuit is not completed.

8. In a sterilizing cabinet having a deposit opening therein and a movable closure for the same, the combination with violet ray lamps mounted within said cabinet, of a transformer having a secondary winding connected to said lamps and the primary winding adapted for connection with a power supply, electromagnetic means for locking the closure member against opening, a timed control switch for controlling the circuit through said primary winding and said electromagnetic locking means upon the closure of said closure member, a visible signal adapted to have its circuit closed upon the closure of said primary winding circuit, means for opening said primary circuit, said locking circuit and said indicator circuit in event the secondary circuit is not completed, and means visible from the exterior of the cabinet for indicating that the secondary circuit has not been completed.

9. In a sterilizing cabinet having a deposit and removal opening therein and a movable closure member for the same, said closure member preventing access to the interior of the cabinet when closed the combination with electrical sterilizing units arranged within said cabinet, electromagnetic means for locking said closure in closed position, time controlled means for controlling the circuit of said closure locking means, and means effective only in event said units are operable operated by the closure of said closure member for establishing a circuit of said electromagnetic locking means.

10. In a sterilizing cabinet having a deposit opening therein and a movable closure for the same, the combination with electrical sterilizing units arranged in said cabinets, of means operated by the closure of said closure member for establishing an energizing circuit through said units, electromagnetically operated means effective only when said units are operable for locking said closure member in closed position means for establishing the energizing circuit thereof by the closing of said closure member and an electromagnetically operated time controlled means for controlling said sterilizing unit circuit and said locking means circuit, the energizing circuit for said time controlled means being established by the closure of said closure member.

11. In a sterilizing cabinet having a deposit opening therein and a movable closure for the same, the combination with electrical sterilizing units arranged within said cabinets, an electromagnetically operated relay in the circuit of said sterilizing units, a switch controlling said circuit, means operated by the closure of said closure member for momentarily establishing the circuit of said relay, said relay having a set of contacts adapted to be closed by the operation thereof for establishing a maintaining circuit through said relay and including the sterilization units energizing circuit, a switch controlling said maintaining circuit, a time control electromagnetic means for controlling the operation of said switch and a second set of contacts operated by said current relay for closing the circuit through said time control means.

12. In a sterilizing cabinet having a deposit opening therein and a movable closure for the same, the combination with electrical sterilizing units arranged within said cabinet, of a transformer having its secondary connected in the circuit of said units, an electromagnetically operated switch connected in series with the primary of said transformer and having a set of contacts for controlling the circuit through the transformer and said electromagnet of said switch, a second set of contacts controlling the circuit through said electromagnet and said primary, means for controlling said last named switch, an electric motor for driving said means, a set of contacts operated by said electromagnet for controlling the circuit of said electric motor, and a third set of contacts adapted to be momentarily closed by the closure of said closure member for initially establishing a circuit through said transformer primary and the electromagnet of said first mentioned switch.

13. In a sterilizing cabinet having a deposit opening therein and a movable closure for the same, the combination with electrical sterilizing units arranged in said cabinet, of a transformer for supplying electrical energy through said sterilizing units having its secondary connected in the circuit of said sterilizing units, an electric magnetic relay connected in series with the primary of said transformer, said relay having a pair of contacts controlling a maintaining circuit through said relay and said transformer, a second set of contacts controlling the maintaining circuit through said transformer and relay, an electromagnetically operated lock for locking said closure member in closed position having its circuit controlled by said first two mentioned sets of contacts, means for controlling the operation of said second set of contacts, an electric motor for driving said means, a second set of contacts operated by said current relay for the control of the circuit through said electric motor and a set of contacts momentarily closed by the closing of said closure member for initiating a circuit through said transformer and said current relay.

14. In a sterilizing cabinet having a deposit opening therein and a movable closure for the same, the combination with electrical sterilizing units arranged within said cabinet, electromagnetically operated means for locking said closure in its closed position, a time controlled switch for controlling the energization of said sterilizing units, an electromagnetic relay controlling the circuit of the electromagnet of the door locking means and the circuit of the time controlled switch, operative only in event the sterilizing units become operative, and a switch operated by the closing of the closure member for energizing said relay.

TULLY DE STEFANI.
RUDOLPH YUZA.